United States Patent
Chang et al.

(10) Patent No.: US 8,744,245 B2
(45) Date of Patent: Jun. 3, 2014

(54) SYSTEM AND METHOD FOR SUMMARY COLLECTION AND PLAYING OF SCENES AND RECORDING MEDIUM THEREOF

(71) Applicant: Institute for Information Industry, Taipei (TW)

(72) Inventors: Chia-Hsiang Chang, Taipei (TW); Emery Jou, Taipei (TW); Jing-Fung Chen, New Taipei (TW); Pei-Wen Huang, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/714,176

(22) Filed: Dec. 13, 2012

(65) Prior Publication Data

US 2014/0105572 A1   Apr. 17, 2014

(30) Foreign Application Priority Data

Oct. 17, 2012  (TW) .............................. 101138304 A (51) Int. Cl.
*H04N 5/76* (2006.01)
*H04N 9/80* (2006.01)

(52) U.S. Cl.
USPC ........... 386/299; 386/239; 386/240; 386/291; 386/296; 386/297

(58) Field of Classification Search
USPC .................. 386/239, 240, 291, 296, 297, 299
See application file for complete search history.

(56) References Cited

U.S. PATENT DOCUMENTS

2001/0049826 A1 * 12/2001 Wilf ............................. 725/120
2002/0133486 A1 *  9/2002 Yanagihara et al. .............. 707/3
2005/0125419 A1 *  6/2005 Mizutani et al. ................ 707/10

FOREIGN PATENT DOCUMENTS

KR   10-2004-0041127 A    5/2004

* cited by examiner

*Primary Examiner* — Daquan Zhao
(74) *Attorney, Agent, or Firm* — Muncy, Geissler, Olds & Lowe, P.C.

(57) ABSTRACT

A system and a method for summary collection and playing of scenes and a recording medium thereof are provided. The system includes media supply equipment, a scene description server, a scene server, and an end device. The media supply equipment supplies media data. The scene description server supplies scene description information of a scene segment corresponding to the media data, where each piece of scene description information records a playing content of the scene segment corresponding thereto. The scene server obtains the media data and a summary collect command supplied by the end device, and retrieves a plurality of partial scene segments from the media data according to an analysis result of the summary collect command and the playing content recorded by each piece of scene description information, so as to form media summary data and output the media summary data to the end device.

10 Claims, 8 Drawing Sheets

| Countdown | Description of Team A | Scores in the third quarter | Description of Team B |
|---|---|---|---|
| 11:39 | Player #2 scored a three-point goal | 55-44 | |
| 11:13 | Time-out | 55-44 | Player #4 was substituted by Player #6 |
| 10:50 | Player #6 committed a foul | 55-44 | |
| 10:50 | | 55-45 | Player #7 scored a first free throw |
| 10:50 | | 55-45 | Player #7 missed a second free throw |
| 10:49 | | 55-47 | Player #6 scored a second free throw |
| 10:26 | Player #13 missed a layup | 55-47 | |
| 10:25 | | 55-47 | Player #14 fought for a rebound |
| 10:02 | | 55-47 | Player #22 missed a layup |
| 10:01 | Player #6 fought for a rebound | 55-47 | |
| 09:39 | Player #2 scored a layup | 57-47 | |
| 09:16 | | 57-50 | Player #6 scored a three-point goal |
| 08:58 | Player #2 scored a three-point goal | 60-50 | |
| 08:46 | Player #13 intercepted the ball and passed the ball to Player#2 | 60-50 | Player #7 made a bad pass |
| 08:44 | Player #2 scored a layup | 62-50 | |
| 08:30 | | 62-50 | Player #6 missed a three-point shot |
| 08:29 | | 62-52 | Player #7 scored a rebound goal |
| 08:07 | Player #6 scored a layup | 64-52 | |
| 07:54 | | 64-52 | Player #6 missed a three-point shot |
| 07:53 | | 64-52 | Player #7 grabbed a rebound and passed the ball to Player#6 |
| 07:47 | | 64-55 | Player #6 scored a three-point goal |
| 07:35 | Player #2 scored a layup | 66-55 | |
| ⋮ | ⋮ | ⋮ | ⋮ |

SYSTEM AND METHOD FOR SUMMARY COLLECTION AND PLAYING OF SCENES AND RECORDING MEDIUM THEREOF

CROSS-REFERENCE TO RELATED APPLICATION

This application claims the benefit of Taiwan Patent Application No. 101138304, filed on Oct. 17, 2012, which is hereby incorporated by reference for all purposes as if fully set forth herein.

BACKGROUND OF THE INVENTION

1. Field of Invention

The present invention relates to a system and a method for summary collection and playing of scenes and a recording medium thereof, and more particularly to a system and a method for summary collection and playing of scenes and a recording medium thereof, which can retrieve a demanded media segment by means of scene description information.

2. Related Art

In the prior art, media data is usually played in a linear manner. Image playing software provides a timeline of playing the media data correspondingly. A user may click different positions of the timeline or drag a slider on the timeline to determine an image playing segment.

However, when a user is unfamiliar with the content of media data but intends to create summary data for the media data, the user needs to spend much time to find demanded video scenes. Next, the precision of dragging a slider depends on the length of the timeline. If the timeline is too short, it is difficult for the user to drag the slider to a demanded fixed point, and operational troubles of the user are increased. Thirdly, when a user intends to acquire a targeted image or voice from the media data or to further create proper media summary data for the media data, the user must manually control the timeline and cannot directly find related video scenes. Fourthly, to improve the precision of image collection, at least one of a specific image collection program, software, and tool needs to be used. However, the preceding problems increase not only the cost of media collection but also the operational complexity for a user. In addition, a user cannot make a personalized choice and watch a desired segment and the media cannot be flexibly operated.

Therefore, how to simplify the collection, control, and operation of the media data and meanwhile supply a customized media control technology meeting user requirements is a subject to be considered by manufacturers.

SUMMARY OF THE INVENTION

To solve the above problem, the present invention discloses a system and a method for summary collection and playing of scenes and a recording medium thereof, in which media is selected based on scene description information, so as to supply a media segment demanded by a user.

The system for summary collection and playing of scenes disclosed by the present invention comprises media supply equipment, a scene description server, a scene server, and an end device.

The media supply equipment is used for supplying media data. The end device is used for inputting a summary collect command. The scene description server is used for receiving the media data, so as to provide scene description information of a scene segment corresponding to the media data, where each piece of scene description information records a playing content of a scene segment corresponding thereto. The scene server is used for obtaining the summary collect command, and according to the summary collect command, analyzing the playing content recorded by each piece of scene description information, retrieving, according to an analysis result, a plurality of partial scene segments from the media data to form media summary data, and outputting the media summary data to the end device.

The method for summary collection and playing of scenes disclosed by the present invention comprises: supplying, by media supply equipment, media data; receiving, by a scene description server, the media data, and supplying scene description information of a scene segment corresponding to the media data, where each piece of scene description information records a playing content of a scene segment corresponding thereto; obtaining, by a scene server, a summary collect command supplied by an end device; and according to the summary collect command, analyzing, by the scene server, the playing content recorded by each piece of scene description information, retrieving a plurality of partial scene segments from the media data to form media summary data; and outputting, by the scene server, the media summary data to the end device.

In addition, the present invention also discloses a recording medium that stores a program code readable by an electronic device. When an electronic device reads the program code, a method for summary collection and playing of scenes is executed. The method is as discussed above.

The present invention is characterized by the following features. First, media summary data demanded by a user can be supplied in a targeted manner by means of analyzing scene description information, and the user does not need to spend much time to find the demanded video scenes. Secondly, a user can obtain demanded media summary data without bothering to control the timeline of the media data. In this way, not only scene videos can be precisely supplied, but also the complexity of image control can be simplified, which avoids the operational trouble that a user needs to drag a slider to a demanded fixed point. Thirdly, by collecting a targeted scene segment, a user can obtain demanded scene segments once for all, so as to create proper media summary data for media data. In this way, not only customized media operations that satisfy the demand of a user is formed, but also the operational complexity for the user is reduced. Fourthly, through analyzing scene description information and supplying media summary data, the user can watch/listen to the outline content of media data in advance, so as to determine whether to play the whole content of the media data.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The embodiments of the present invention are illustrated below in detail with reference to the accompanying drawings.

Figure 1:
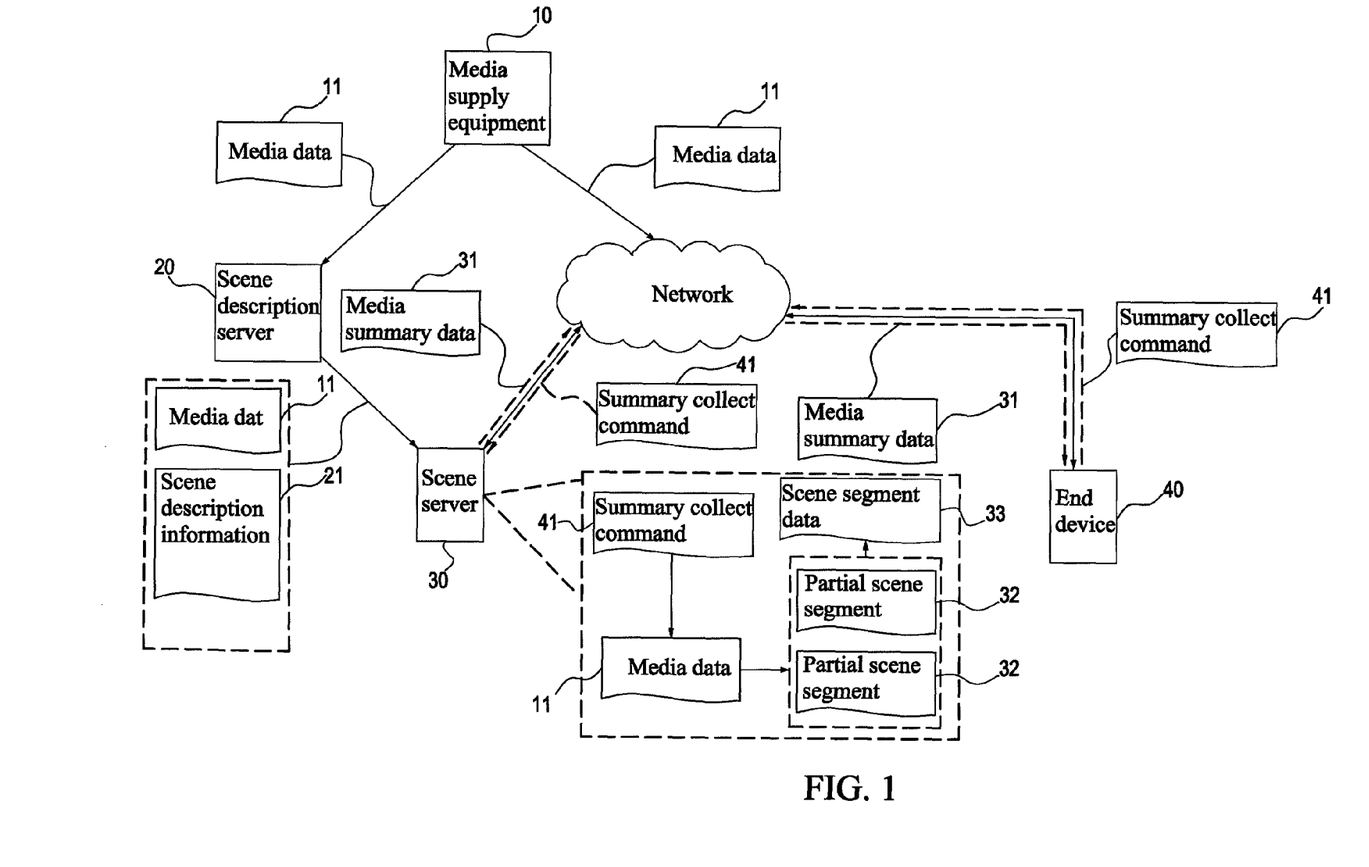
FIG. 1 is a schematic structural view of a system for summary collection and playing of scenes according to an embodiment of the present invention.

FIG. 1 is a schematic structural view of a system for summary collection and playing of scenes according to an embodiment of the present invention. The system can be applied to a device, apparatus, or system with a media playing capability, and the configuration form is not limited. The system for summary collection and playing of scenes includes a client side and a server side, and equipment and devices on the two sides are connected through a network. The server side includes media supply equipment 10, a scene description server 20, and a scene server 30. The client side includes more than one end device, which are electronic devices of a user, such as a personal computer (PC), a notebook computer, a tablet PC, a smart phone, and a set-top box (STB), and these electronic devices have man-machine interfaces for a user to operate on and are capable of connecting to a network. In this example, an end device 40 is taken as an example for illustration.

The media supply equipment 10 is used for supplying media data 11. The media data 11 may be integral image data, voice data, or video/audio data, or may be stream data transmitted in real time. The media supply equipment 10 may be at the same location as the scene description server 20 and the scene server 30, or may be third-party equipment at a different location, which is not limited. The media supply equipment 10 outputs the media data 11 in wired and wireless data transmission modes, which include: broadcast, broadband delivery, wired transmission (for example, community antenna television and cable television (CATV)), and network protocol transmission (Internet protocol television (IPTV)), which are not limited herein.

The media supply equipment 10 includes hardware or a combination of more than at least one form of a unit, component, device, apparatus, and system with a media supplying capability that combines software and hardware. The media data 11 includes multiple scene segments of different contents. For example, when the media data 11 is image data, the image data means image segments having more than one of contents such as targets, scenes, and characters. In another example, when the media data 11 is voice data, the voice data means voice segments having more than one of contents such as high pitches, low pitches, speeches and music.

When obtaining the media data 11, the scene description server 20 supplies scene description information 21 corresponding to the media data 11. The scene description information 21 is annotation data for annotating the media data 11 or further for annotating scene segments included in the media data 11. In this embodiment, each piece of scene description information 21 records a playing content of a scene segment corresponding thereto. The scene description information 21 can be supplied in the following manners: (1) The scene description server 20 directly creates the scene description information 21 according to the media data 11 or playing contents of the scene segments; (2) The scene description information 21 corresponding to the media data 11 is obtained from an external device.

The end device 40 includes a data input interface for the user to input data and is capable of playing media. A presentation end of the interface of the end device 40 depends on the demands of designers and is not limited. The user uses the end device 40 to input a summary collect command 41.

The summary collect command 41 refers to a request condition input by a user when the user intends to request a specific media segment in the media data 11. The request condition is a playing content of the media data 11 or the scene segment. For example, when the media data 11 is recorded images of a basketball game, a user inputs a request condition involving scoring pictures of his favorite players, or scoring pictures of three-point shots of all players in the game, or scoring pictures of three-point shots of his favorite players and the like. Further, for example, when the media data 11 is music data such as an opera, a user inputs a request condition involving solos of a female protagonist of the opera or absolute music portion performance and the like.

The scene server 30 obtains the summary collect command 41 and the media data 11. The media data 11 can be obtained from the scene description server 20 or the media supply equipment 10. The scene server 30 analyzes the playing content recorded by each piece of scene description information 21 according to the summary collect command, retrieves, according to an analysis result, a plurality of partial scene segments 32 from the media data 11, and forms the scene segments into media summary data 31 to be output to the end device 40.

However, the type of the request condition included in the summary collect command 41 can be illustrated as follows:

(1) The summary collect command 41 includes content specification information. When the scene server 30 analyzes recorded information of the scene description information 21 according to the summary collect command 41, the scene server 30 obtains scene description information 21 whose recorded information conforms to the content specification information, and retrieves partial scene segments 32 corresponding to the pieces of scene description information 21, so as to form the media summary data 31.

(2) The scene server 30 first classifies the scene description information 21 according to the recorded information of the scene description information 21, and obtains more than one piece of scene segment data 33 by dividing the media data 11. The summary collect command 41 includes content specification data. When the scene server 30 analyzes the recorded information of the scene description information 21 according to the content specification data, the scene server 30 retrieves more than one piece of target scene segment data 33 from all the scene segment data 33, so as to form the media summary data 31.

In addition, the summary collect command 41 may include more than one type of request condition and may include multiple different request conditions to meet collection requirements. The scene server 30 can obtain one or multiple pieces of media summary data 31 from the media data 11 according to each request condition.

The end device 40 plays the media summary data 31 or presents the media summary data 31 as a list after receiving one or multiple pieces of media summary data 31. The user selects, through a control interface of the end device 40, one or multiple pieces of media summary data 31 for playing.

Further, according to the recorded information of the scene description information 21, the scene server 30 obtains data dependence relationships of the scene description information 21 or types of data attributes to classify the scene description information 21, and obtains a plurality of pieces of scene segment data 33 through division according to a classification result. According to data dependences of the scene description information 21, data attributes, and data level relationships, the scene server 30 constructs a media playing tree structure with the pieces of scene segment data 33. When obtaining the summary collect command 41, the scene server 30 collects, according to the summary collect command 41, related scene segment data 33 from the media playing tree structure, so as to form the media summary data 31. In addition, the summary collect command 41 may include a piece of tree structure level data, which records a tree level of the media playing tree structure. When obtaining the summary collect command 41, the scene server 30 collects at least one partial scene segment 32 and/or at least one piece of scene segment data 33 only from the tree level specified by the tree structure level data, so as to form the media summary data 31.

However, an interface of the end device 40 also presents input fields of the media playing tree structure, and merely according to the data dependence relationships of the request conditions or the types of the data attributes, the user input each request condition into each field, which is used as a reference for collection and classification of the scene segments by the scene server 30.

However, the media supply equipment 10 also supplies a plurality of pieces of media data 11, and the scene description server 20 supplies scene description information 21 corresponding to each piece of media data 11. When inputting the summary collect command 41 by means of the end device 40, the user may set a different request condition for each piece of media data 11 or set a request condition for all the media data 11, which depends on demands of the user.

The scene server 30 analyzes related scene description information 21 according to the summary collect command 41, forms one or multiple pieces of media summary data 31 from the media data 11, and returns the media summary data 31 to the end device 40.

However, the collected results, such as the scene segments, the scene description information 21, the media playing tree structure, and the played media, can be stored in the scene server 30 for use when the media summary data 31 needs to be supplied again. Furthermore, the media summary data 31 created through operations on the scene segments can be stored in the end device 40, so that playing software/hardware can directly select and play the media summary data 31.

Figure 2:
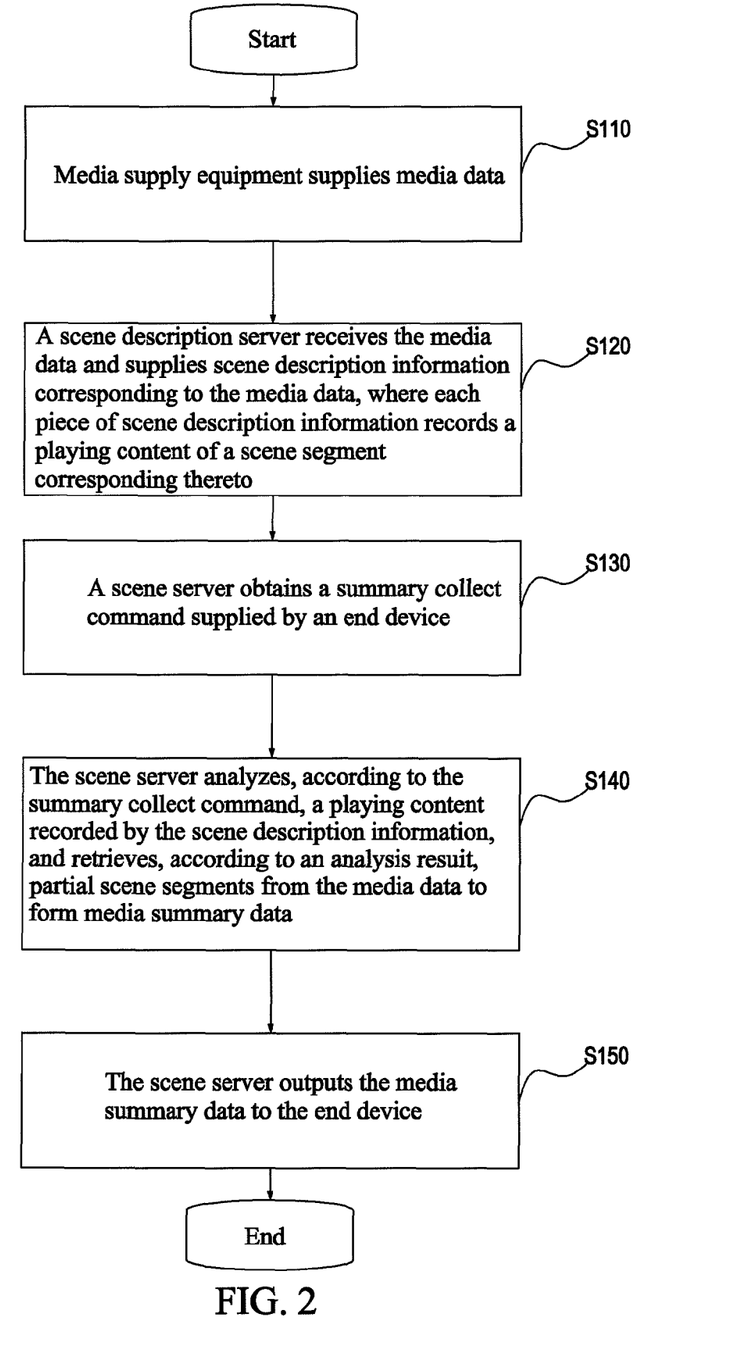
FIG. 2 is a schematic flow chart of a method for summary collection and playing of scenes according to an embodiment of the present invention.
Figure 3:
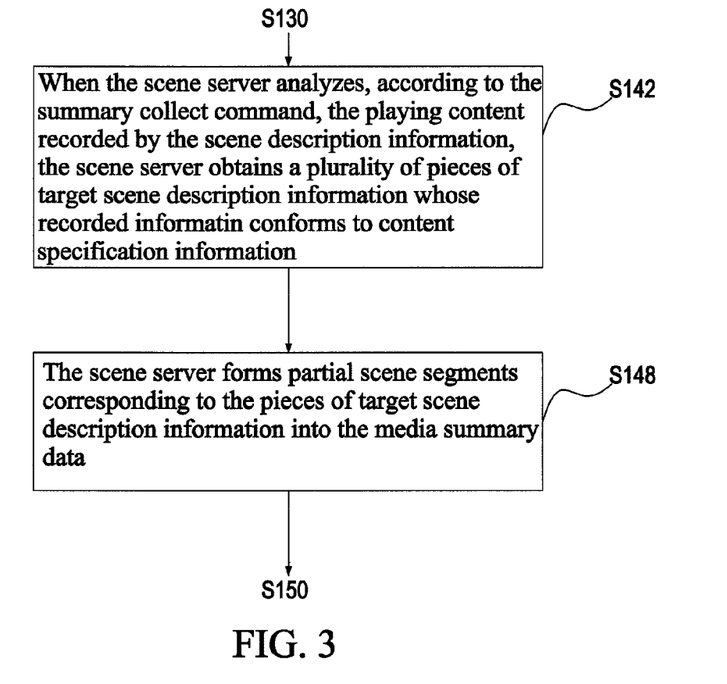
FIG. 3 and FIG. 4 are detailed schematic flow charts of a method for summary collection and playing of scenes according to an embodiment of the present invention.
Figure 4:
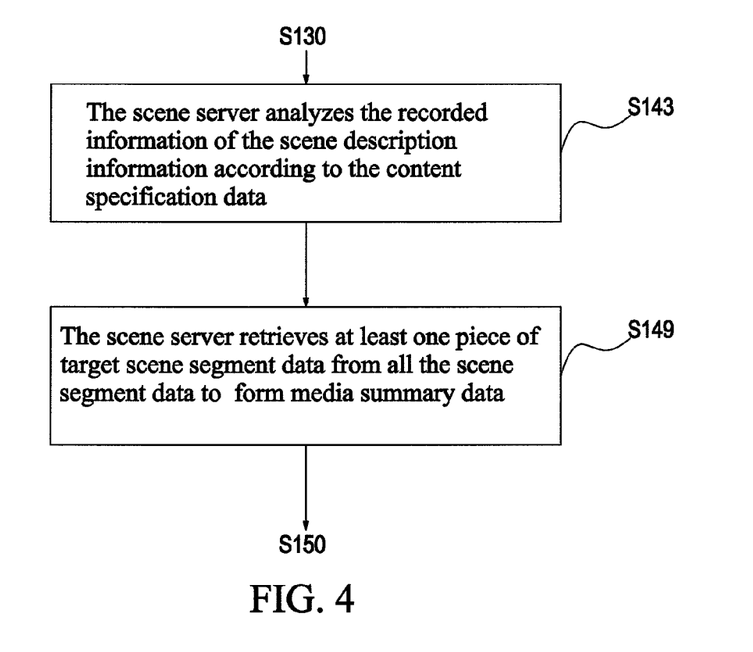

FIG. 2 is a schematic flow chart of a method for summary collection and playing of scenes according to an embodiment of the present invention. FIG. 3 and FIG. 4 are detailed schematic flow charts of a method for summary collection and playing of scenes according to an embodiment of the present invention. Refer to FIG. 1 to FIG. 3 for ease of comprehension. The process of the method is as follows:

Media supply equipment 10 supplies media data 11 (Step S110). As described above, the media data 11 supplied by the media supply equipment 10 may be integral image data, voice data, or video/audio data, or may be stream data transmitted in real time. The media data 11 can be transmitted in wired and wireless modes, which include: broadcast, broadband delivery, wired transmission, and network protocol transmission.

A scene description server 20 receives the media data 11 and supplies scene description information 21 corresponding to the media data 11, where each piece of scene description information 21 records a playing content of a scene segment corresponding thereto (Step S120). As described above, the scene description information 21 can be provided in the following manners: (1) The scene description server 20 directly creates the scene description information 21 according to the media data 11 or a playing content of a scene segment; (2) The scene description information 21 corresponding to the media data 11 can be obtained from an external device.

A scene server 30 obtains a summary collect command 41 supplied by an end device 40 (Step S130). The summary collect command 41 is a request condition input by a user when the user intends to request a specific media segment in the media data 11. The request condition is a playing content of the media data 11 or the scene segment.

The scene server 30 analyzes the playing content recorded by each piece of scene description information 21 according to the summary collect command 41, and retrieves, according to an analysis result, partial scene segments 32 from the media data 11 to form media summary data 31 (Step S140). In this step, according to different request conditions included in the summary collect command 41, the scene server 30 retrieves the partial scene segments 32 in different manners, which are illustrated as follows:

(1) As shown in FIG. 1 and FIG. 3, each piece of scene description information 21 stores a playing content of a scene segment corresponding thereto, and the summary collect command 41 includes content specification information. In this step, when analyzing the playing content recorded by each piece of scene description information 21 according to the summary collect command 41, the scene server 30 obtains a plurality of pieces of target scene description information whose recorded information conforms to the content specification information (Step S142). Subsequently, the scene server 30 forms partial scene segments 32 corresponding to the pieces of target scene description information into the media summary data 31 (Step S148).

(2) As shown in FIG. 1 and FIG. 4, the scene server 30 classifies the scene description information 21 according to the recorded information of the scene description information 21, and obtains a plurality of pieces of scene segment data 33 from the media data 11 through division according to a classification result. The summary collect command 41 includes content specification data. In this step, the scene server 30 analyzes the recorded information of the scene description information 21 according to the content specification data (Step S143), and retrieves at least one piece of target scene segment data 33 from all the scene segment data 33, so as to form the media summary data 31 (Step S149).

Subsequently, the scene server 30 outputs the media summary data 31 to the end device 40 (Step S150). When receiving one or multiple pieces of media summary data 31, the end device 40 plays the media summary data 31, or presents the media summary data 31 as a list, or stores the media summary data 31 in the end device 40. The user selects, through a control interface of the end device 40, one or multiple pieces of media summary data 31 for playing.

Figure 5:
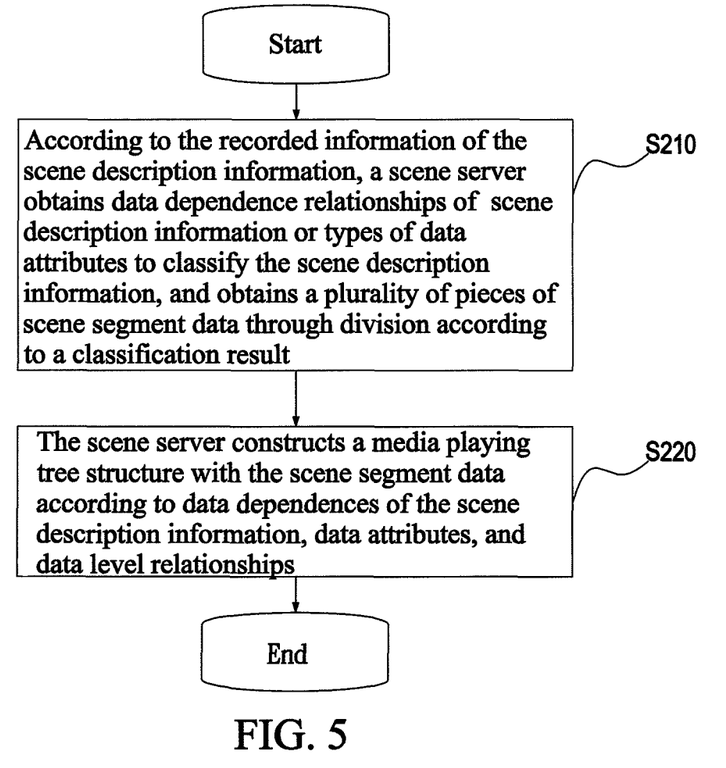
FIG. 5 is a schematic flow chart for constructing a media playing tree structure according to an embodiment of the present invention.

FIG. 5 is a schematic flow chart for constructing a media playing tree structure according to an embodiment of the present invention. Refer to FIG. 1 for ease of comprehension. The method includes the following steps.

According to the recorded information of the scene description information 21, the scene server 30 obtains data dependence relationships of the scene description information 21 or types of data attributes to classify the scene description information 21, and obtains a plurality of pieces of scene segment data 33 through division according to a classification result (Step S210).

The scene server 30 constructs a media playing tree structure with the scene segment data 33 according to data dependences of the scene description information 21, data attributes, and data level relationships (Step S220).

Therefore, in Step S140, when obtaining the summary collect command 41, the scene server 30 collects the partial scene segments from the media playing tree structure according to the summary collect command 41, so as to form the media summary data 31.

FIG. 6 to FIG. 9 are schematic views of scenarios of media control according to embodiments of the present invention. Herein, media data 11 is described as recorded images of a basketball game.

Figure 6:
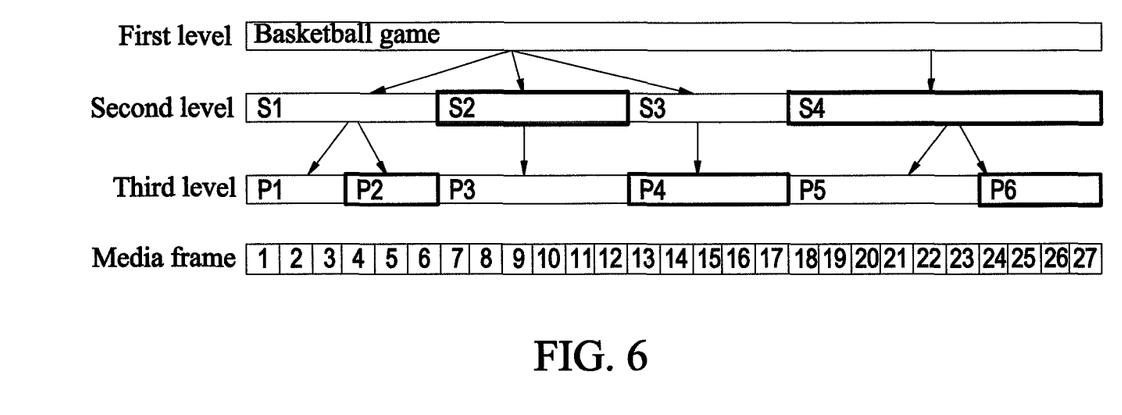
FIG. 6 is a schematic view of media levels according to an embodiment of the present invention.

FIG. 6 is a schematic view of media levels according to an embodiment of the present invention. The recorded images of the basketball game can be divided into different image levels. The highest level means the images of the whole game, the next level means the images of all quarters, and the next level means images of close-up shots. The whole images are formed of multiple scene segments and correspond to the scene description information 21.

Figure 7:
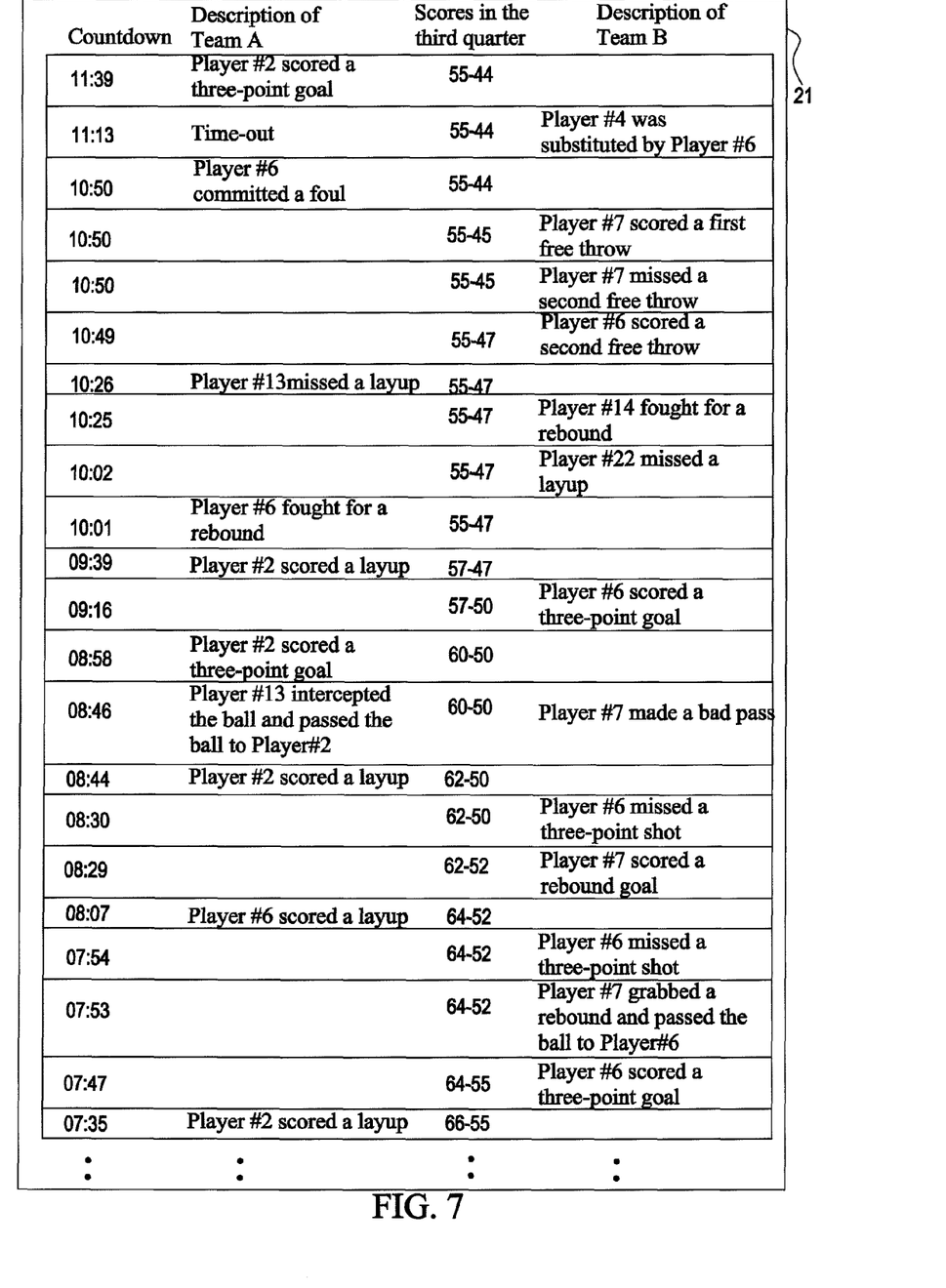
FIG. 7 is a schematic view of scene description information according to an embodiment of the present invention.

FIG. 7 is a schematic view of scene description information according to an embodiment of the present invention, in which a scene instruction and a scene corresponding time of an image of a basketball game are presented.

When a user merely wants to watch a summary picture of "scoring pictures of three-point shots in the third quarter", the user may set the "scoring pictures of three-point shots in the third quarter" as the content specification information in the summary collect command 41. The scene server 30 takes the countdown of the third quarter "11:39", "09:16", "08:58", "07:47" and so on and timepoints corresponding to the "scoring scenes of three-point shots in the third quarter". The scene server 30 collects corresponding scene segment data 32 before or after the timepoints or using the timepoints as centers, and combines the scene segment data 32 to form the media summary data 31, so that the related end device can play the media summary data 31.

Figure 8:
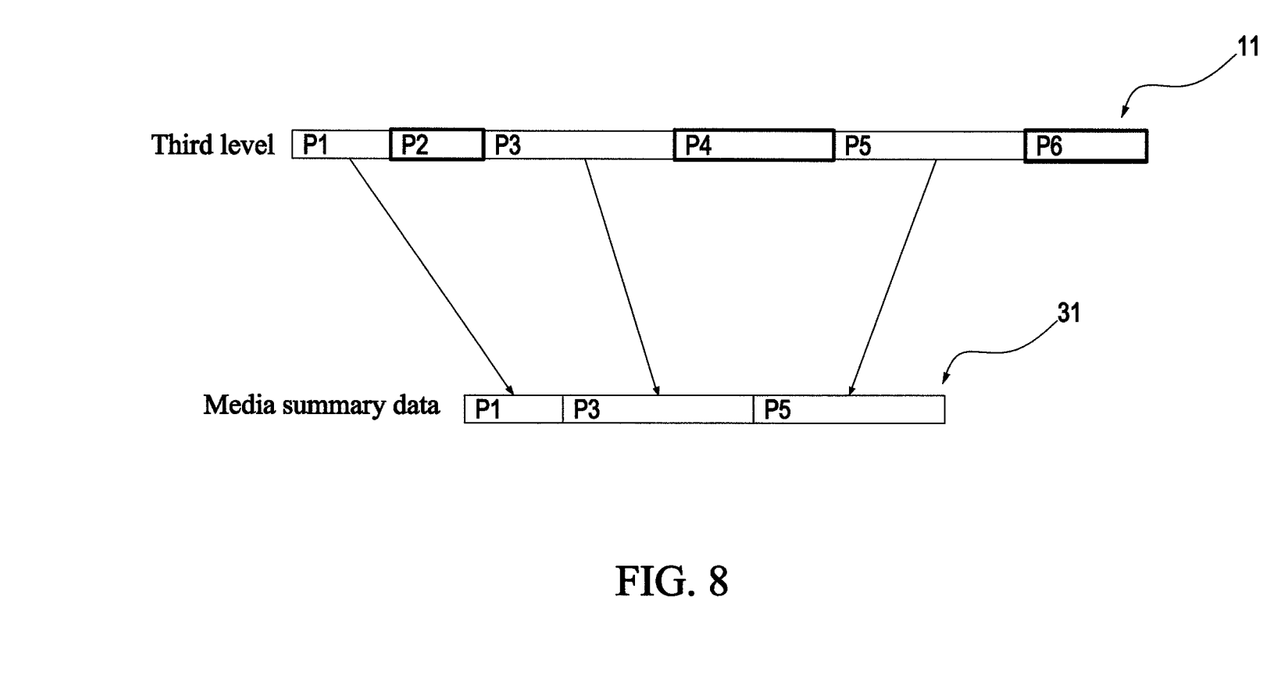
FIG. 8 is a schematic view of formation of media summary data according to an embodiment of the present invention.

FIG. 8 is a schematic view of formation of media summary data according to an embodiment of the present invention. It is assumed that the scene segments of the "scoring pictures of three-point shots in the third quarter" are included in scene segments P1, P3, and P5. The scene server 30 collects P1, P3, and P5 from the media data 11, and uses them to form the above media summary data 31, so that the related end device can play the media summary data 31.

Figure 9:
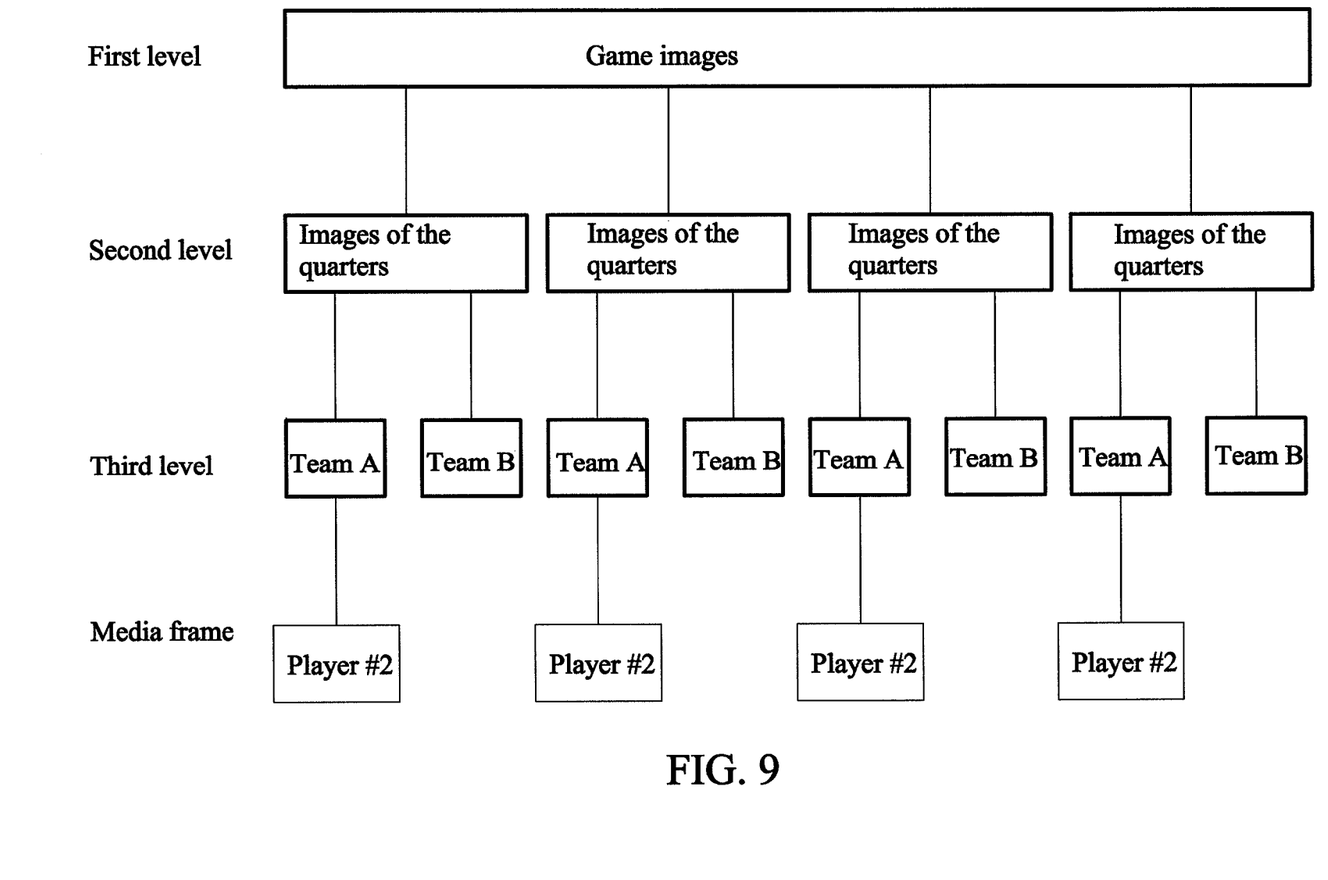
FIG. 9 is a schematic view of a media playing tree structure according to an embodiment of the present invention.

FIG. 9 is a schematic view of a media playing tree structure according to an embodiment of the present invention. Herein, by combining the image levels shown in FIG. 6 and the data dependence relationships of the summary collect command 41 or the types of data attributes described above, a media playing tree structure may be constructed with the whole recorded images, the scene description information 21 or the scene segment data 33.

The first level of the media playing tree structure refers to the whole game images. The second level refers to the branches of the first level images, which are images of the quarters. The third level refers to the branches of the second level images, which are close-up shot images of the two teams in a game. The fourth level refers to the branches of the third level images, which are close-up shot images of specific players from the two teams in the game.

After a user sets the summary collect command 41, the scene server 30 collects demanded scene segment data 33 through the media playing tree structure according to the content specification data included in the summary collect command 41, so as to form the media summary data 31 and output the media summary data 31 to the end device 40.

However, regardless of the above image levels, the scene server 30 can retrieve scene segment data 33 from any level according to first target scene description information 42 to form the above media summary data. In addition, the media summary data 31 may also include tree structure level data, which specifies levels of scene segment data 33 that the scene server 30 can retrieve from the media playing tree structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for summary collection and playing of scenes, comprising:
   a media supply equipment, used for supplying a media data;
   a scene description server, used for receiving the media data and supplying scene description information of a scene segment corresponding to the media data, wherein each piece of scene description information records a playing content of the scene segment corresponding thereto;
   a scene server, used for obtaining a summary collect command and the media data, and, analyzing the playing content recorded by each piece of scene description information according to the summary collect command, and retrieving a plurality of partial scene segments from the media data according to an analysis result to form media summary data for outputting,
   wherein the scene server classifies the scene description information according to recorded information of the scene description information, obtains a plurality of pieces of scene segment data from the media data through division according to a classification result, and constructs a media playing hierarchical structure with the scene segment data according to data dependences of the scene description information, data attributes, and data level relationships,
   wherein when the scene server obtains the summary collect command, the scene server collects, according to the summary collect command, at least one piece of scene segment data from the media playing hierarchical structure to form the media summary data; and
   an end device, used for inputting the summary collect command and obtaining the media summary data.

2. The system for summary collection and playing of scenes according to claim 1, wherein the summary collect command comprises a content specification information, and when the scene server analyzes the scene description information according to the summary collect command, the scene server obtains a plurality of pieces of target scene description information whose recorded information conforms to the content specification information, and retrieves the partial scene segments corresponding to the pieces of target scene description information to form the media summary data.

3. The system for summary collection and playing of scenes according to claim 1, wherein the scene server classifies the scene description information according to recorded information of the scene description information, and obtains a plurality of pieces of scene segment data from the media data through division according to a classification result, the summary collect command comprises content specification data, and the scene server analyzes the recorded information of the scene description information according to the content specification data, and retrieves at least one piece of target scene segment data from the pieces of scene segment data to form the media summary data.

4. The system for summary collection and playing of scenes according to claim 1, wherein the summary collect command comprises hierarchical structure level data, and according to a hierarchical level recorded by the hierarchical structure level data, the scene server collects at least one piece of scene segment data from the media playing hierarchical structure to form the media summary data.

5. A method for summary collection and playing of scenes, comprising:
supplying a media data by media supply equipment;
receiving, by a scene description server, the media data, and supplying scene description information of a scene segment corresponding to the media data, wherein each piece of scene description information records a playing content of the scene segment corresponding thereto;
obtaining, by a scene server, a summary collect command supplied by an end device;
analyzing, by the scene server, the playing content recorded by each piece of scene description information according to the summary collect command, and retrieving a plurality of partial scene segments from the media data to form media summary data according to an analysis result;
classifying, by the scene server, the scene description information according to data dependence relationships of the scene description information or types of data attributes, and obtaining a plurality of pieces of scene segment data through division according to a classification result;
constructing, by the scene server, a media playing hierarchical structure with the pieces of scene segment data according to data dependences of the scene description information, data attributes, and data level relationships;
collecting, by the scene server, the partial scene segments from the media playing hierarchical structure to form the media summary data according to the summary collect command; and
outputting, by the scene server, the media summary data to the end device.

6. The method for summary collection and playing of scenes according to claim 5, wherein each piece of scene description information stores the playing content of the scene segment corresponding thereto, the summary collect command comprises content specification information, and the step of analyzing, by the scene server, the scene description information according to the summary collect command and retrieving the partial scene segments from the media data to form the media summary data comprises:
when the scene server analyzes the scene description information according to the summary collect command, obtaining, by the scene server, a plurality of pieces of target scene description information whose recorded information conforms to the content specification information; and
retrieving, by the scene server, the partial scene segments corresponding to the pieces of target scene description information to form the media summary data.

7. The method for summary collection and playing of scenes according to claim 5, wherein the scene server classifies the scene description information according to recoded information of the scene description information, and obtains a plurality of pieces of scene segment data from the media data through division according to a classification result, the summary collect command comprises content specification data, and the step of analyzing, by the scene server, the scene description information according to the summary collect command and retrieving the partial scene segments from the media data to form the media summary data comprises:
analyzing, by the scene server, the recorded information of the scene description information according to the content specification data, and retrieving at least one piece of target scene segment data from the pieces of scene segment data to form the media summary data.

8. A non-transitory recording medium, storing a program code readable by an electronic device, wherein when an electronic device reads the program code, a method for summary collection and playing of scenes is executed, and the method comprises:
supplying, by media supply equipment, media data;
receiving, by a scene description server, the media data, and supplying scene description information of a scene segment corresponding to the media data, wherein each piece of scene description information records a playing content of the scene segment corresponding thereto;
obtaining, by a scene server, a summary collect command supplied by an end device;
according to the summary collect command, analyzing, by the scene server, the playing content recorded by each piece of scene description information, and retrieving, according to an analysis result, a plurality of partial scene segments from the media data to form media summary data;
classifying, by the scene server, the scene description information according to data dependence relationships of the scene description information or types of data attributes, and obtaining a plurality of pieces of scene segment data through division according to a classification result;
constructing, by the scene server, a media playing hierarchical structure with the pieces of scene segment data according to data dependences of the scene description information, data attributes, and data level relationships;
collecting, by the scene server, the partial scene segments from the media playing hierarchical structure to form the media summary data according to the summary collect command; and
outputting, by the scene server, the media summary data to the end device.

9. The non-transitory recording medium according to claim 8, wherein each piece of scene description information stores the playing content of the scene segment corresponding thereto, the summary collect command comprises content specification information, and the step of analyzing, by the scene server, the scene description information according to the summary collect command and retrieving the partial scene segments from the media data to form the media summary data comprises:
when the scene server analyzes the scene description information according to the summary collect command, obtaining, by the scene server, a plurality of pieces of target scene description information whose recorded information conforms to the content specification information; and
retrieving, by the scene server, the partial scene segments corresponding to the pieces of target scene description information to form the media summary data.

10. The non-transitory recording medium according to claim 8, wherein the scene server classifies the scene description information according to recorded information of the scene description information, and obtains a plurality of pieces of scene segment data from the media data through division according to a classification result, the summary collect command comprises content specification data, and the step of analyzing, by the scene server, the scene description information according to the summary collect command and retrieving the partial scene segments from the media data to form the media summary data comprises:
  analyzing, by the scene server, the recorded information of the scene description information according to the content specification data, and retrieving at least one piece of target scene segment data from the pieces of scene segment data to form the media summary data.

* * * * *